US011890891B2

(12) United States Patent
Bechtel

(10) Patent No.: US 11,890,891 B2
(45) Date of Patent: Feb. 6, 2024

(54) TOOL HAVING A WORKPIECE-ENGAGING STRUCTURE THAT POSITIVELY POSITIONS THE TOOL RELATIVE TO THE WORKPIECE

(71) Applicant: Jay A. Bechtel, Liberty Center, OH (US)

(72) Inventor: Jay A. Bechtel, Liberty Center, OH (US)

( * ) Notice: Subject to any disclaimer, the term of this patent is extended or adjusted under 35 U.S.C. 154(b) by 0 days.

(21) Appl. No.: 17/700,001

(22) Filed: Mar. 21, 2022

(65) Prior Publication Data

US 2022/0297469 A1 Sep. 22, 2022

Related U.S. Application Data

(60) Provisional application No. 63/163,792, filed on Mar. 20, 2021.

(51) Int. Cl.
*B43L 7/02* (2006.01)

(52) U.S. Cl.
CPC .................................... *B43L 7/02* (2013.01)

(58) Field of Classification Search
CPC ........................................................ B43L 7/02
See application file for complete search history.

(56) References Cited

U.S. PATENT DOCUMENTS 4,422,245 A * 12/1983 Schiller .................... B43L 7/02 33/42
5,440,818 A * 8/1995 Mailhot .................. B25H 7/02 33/462
5,617,642 A * 4/1997 Marios .................... E04F 21/20 33/526
6,851,201 B1 * 2/2005 Gioia ........................ B43L 7/02 33/492
7,159,328 B1 * 1/2007 Duda ........................ B43L 7/14 33/484
7,845,083 B1 * 12/2010 Cora Rosa ................ B43L 7/02 33/42
2003/0167649 A1 9/2003 Gleeson
2003/0204963 A1 * 11/2003 Siefert ..................... B25H 7/00 33/429
2009/0265949 A1 10/2009 Ruppe, III
2013/0008037 A1 * 1/2013 Ebner ....................... B43L 7/12 33/42
2013/0118022 A1 * 5/2013 Propp ...................... B25H 7/04 33/669
2016/0222684 A1 * 8/2016 Titcomb ................ E04G 17/001
2022/0127865 A1 * 4/2022 Taylor ................. E04G 21/3214
2022/0297469 A1 * 9/2022 Bechtel ..................... B43L 7/02

* cited by examiner

*Primary Examiner* — Yaritza Guadalupe-McCall
(74) *Attorney, Agent, or Firm* — MacMillan, Sobanski & Todd, LLC

(57) ABSTRACT

A tool that can be retained in a predetermined position relative to a workpiece and to perform an operation on the workpiece includes a head portion and a tail portion. The head portion includes a leg that is adapted to engage a first portion of a workpiece when the tool is in a predetermined position relative to the workpiece. The tail portion extends from the head portion and includes a support having a recess that is adapted to engage a second portion of the workpiece when the tool is in a predetermined position relative to the workpiece. An operation-performing device is supported on the tail portion and is operable to perform an operation on the workpiece when the tool is in the predetermined position relative to the workpiece.

8 Claims, 5 Drawing Sheets

TOOL HAVING A WORKPIECE-ENGAGING STRUCTURE THAT POSITIVELY POSITIONS THE TOOL RELATIVE TO THE WORKPIECE

CROSS-REFERENCE TO RELATED APPLICATIONS

This application claims the benefit of U.S. Provisional Application No. 63/163,792, filed Mar. 20, 2021, the disclosure of which is incorporated herein by reference.

BACKGROUND OF THE INVENTION

This invention relates in general to tools that can be positively positioned relative to a workpiece prior to and/or during the performance of an operation on the workpiece. In particular, this invention relates to a tool that can quickly and easily be positioned on and retained in position relative to a workpiece to facilitate the performance of an operation on the workpiece, particularly when the workpiece has an irregular surface.

Corrugated panels are commonly used in a wide variety of structures, such as roof and wall panels in buildings. This is because the corrugations in such corrugated panels provide increased strength, resistance to bending, and other desirable mechanical characteristics. Typically, these corrugated panels are manufactured in a relatively small number of standard sizes and are delivered in bulk to a construction site. Thus, at or near the construction site, one or more customizing operations are usually required to be performed to adapt the sizes of the corrugated panels to the specific needs of the structure. Such customizing operations may include, for example, cutting the panels to appropriate lengths and/or widths, drilling one or more holes through the panels to accommodate the passage of threaded fasteners therethrough, and the like.

In the past, a conventional T-square has been used to facilitate the performance of these customizing operations on the corrugated panels. Although effective, the use of such a conventional T-square for this purpose has been found to be somewhat slow and relatively awkward, particularly when the corrugations in the corrugated panels are relatively large or are spaced apart by relatively long distances. This is because a conventional T-square has a flat engagement surface that can abut an irregularly-shaped engagement surface provided on the corrugated panel, but cannot be positively positioned or otherwise retained thereto. Thus, it would be desirable to provide a tool that can quickly and easily be positioned on and retained in position relative to a workpiece to facilitate the performance of an operation on the workpiece, particularly when the workpiece has an irregular surface.

SUMMARY OF THE INVENTION

This invention relates to a tool that can quickly and easily be positioned on and retained in position relative to a workpiece to facilitate the performance of an operation on the workpiece, particularly when the workpiece has an irregular surface. The tool that can be retained in a predetermined position relative to a workpiece and to perform an operation on the workpiece includes a head portion and a tail portion. The head portion includes a leg that is adapted to engage a first portion of a workpiece when the tool is in a predetermined position relative to the workpiece. The tail portion extends from the head portion and includes a support having a recess that is adapted to engage a second portion of the workpiece when the tool is in a predetermined position relative to the workpiece. An operation-performing device is supported on the tail portion and is operable to perform an operation on the workpiece when the tool is in the predetermined position relative to the workpiece.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
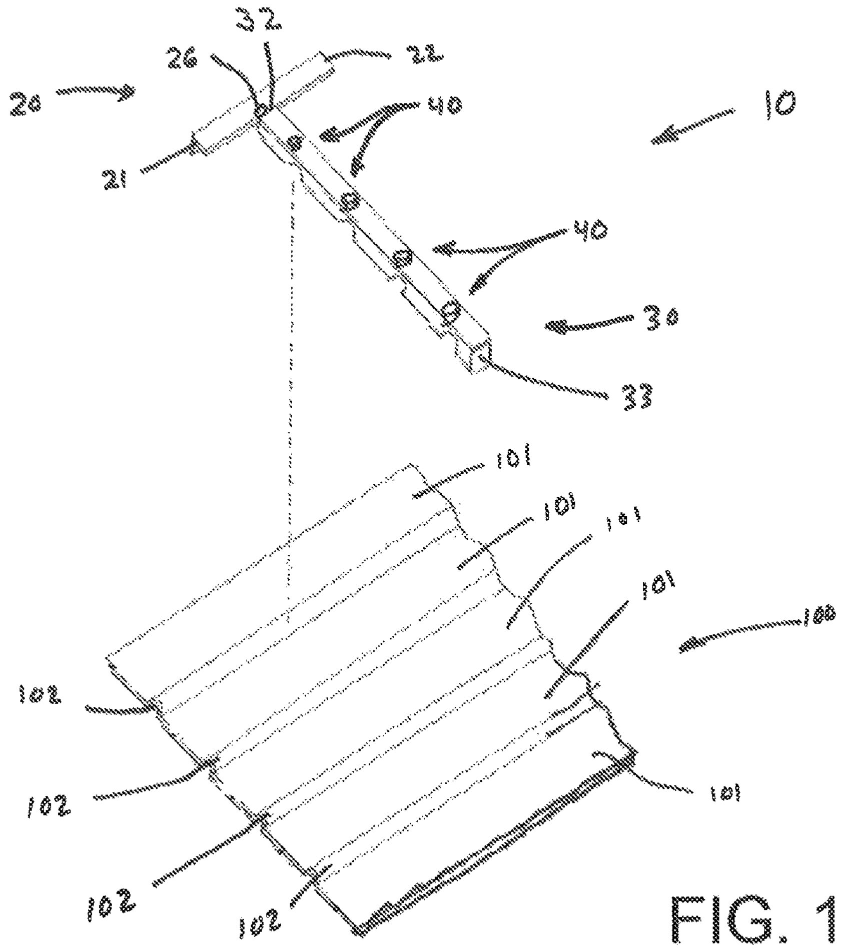
FIG. 1 is an exploded perspective view of a tool in accordance with this invention prior to being positioned and retained on a conventional workpiece.
Figure 2:
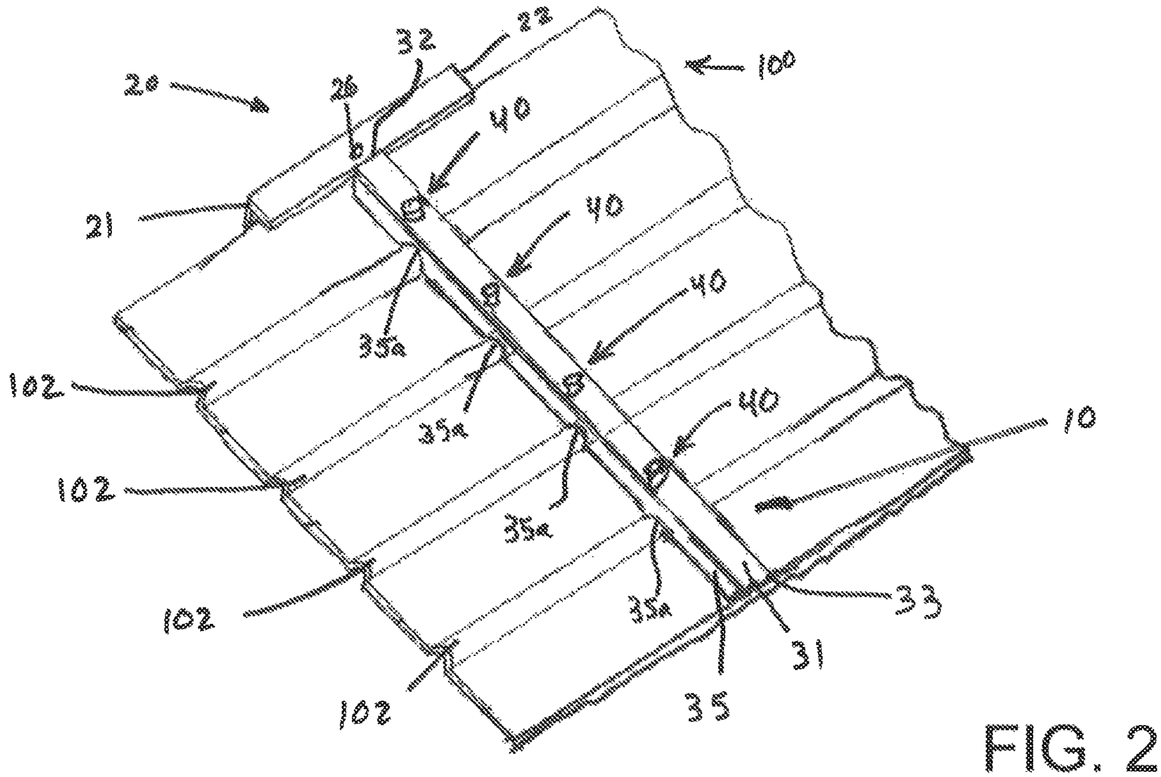
FIG. 2 is a perspective view of the tool and the workpiece illustrated in FIG. 1 shown assembled.
Figure 3:
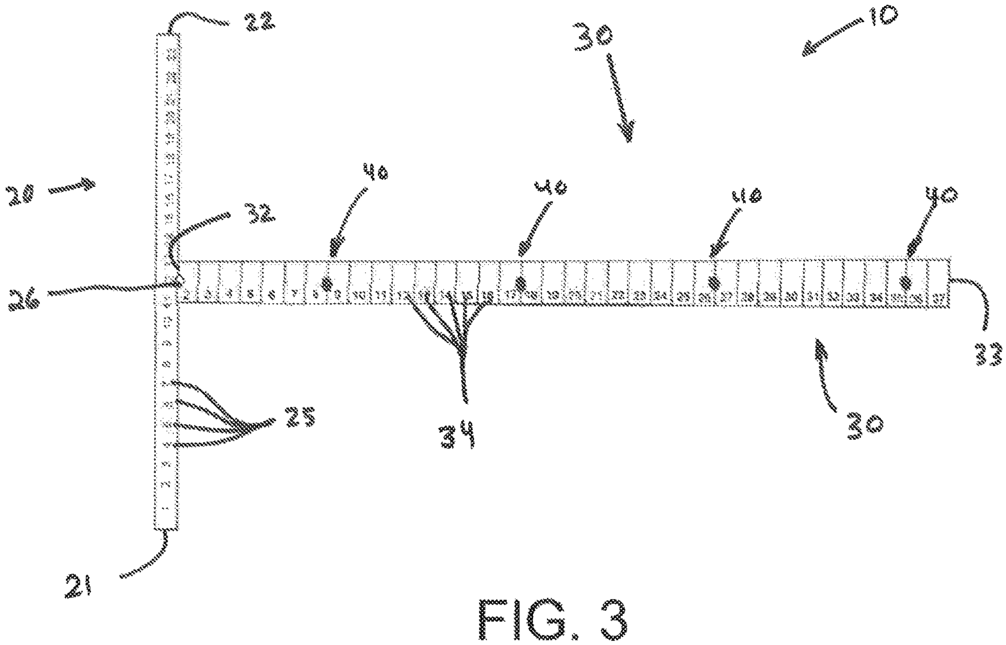
FIG. 3 is a top plan view of the tool illustrated in FIGS. 1 and 2.

Referring now to the drawings, there is illustrated in FIGS. 1 through 11 a tool, indicated generally at 10, that can be positioned and retained quickly and easily relative to a workpiece, indicated generally at 100, to facilitate the performance of an operation by the tool 10 on the workpiece 100. As best shown in FIGS. 1 and 2, the illustrated workpiece 100 is a generally flat corrugated panel 100 that includes a plurality of longitudinally-extending first corrugated portions 101 and a plurality of longitudinally-extending second corrugated portions 102. The illustrated first corrugated portions 101 (which are substantially uniformly shaped) and the illustrated second corrugated portions 102 (which are also substantially uniformly shaped) extend in an alternating manner throughout the illustrated corrugated panel 100. Also, the illustrated first corrugated portions 101 defines a first width that is larger than a second width defined by the second corrugated portions 102. Thus, the upper surface of the illustrated corrugated panel 100 can be characterized as being irregular because it is not entirely planar (at least throughout the portion of such upper surface that will interact with the tool 10 in the manner described below). However, it will be appreciated the illustrated corrugated panel 100 is intended to represent only one type of workpiece with which the tool 10 of this invention may be used. Thus, the scope of this invention is not intended to be limited in any manner by the structure of the illustrated corrugated panel 100.

The structure of the tool 10 is illustrated in detail in FIGS. 1 through 4. As shown therein, the illustrated tool 10 includes a first portion (hereafter referred to as the head portion), indicated generally at 20, that extends linearly from a first end 21 to a second end 22. However, the head portion 20 of the tool 10 need not extend linearly between the first and second ends 21 and 22 thereof. The illustrated head portion 20 of the tool 10 has a generally L-shaped cross-sectional shape defined by a first leg 23 and a second leg 24 that extend generally perpendicular to one another. However, the head portion 20 of the tool 10 may have any desired cross-sectional shape. As used herein, the term "leg" is intended to cover any structure that extends from, or is recessed into, the head portion 20 of the tool 10 that is capable of performing the functions described below.

The illustrated head portion 20 of the tool 10 also has a plurality of markings 25 provided thereon. In the illustrated embodiment, these markings 25 are provided on the upper surface (when viewing FIGS. 1 through 9) of the head portion 20 of the tool 10 and are expressed in the manner of a conventional twenty-four inch ruler having one-eighth inch intervals. However, the markings 25 may be provided at any other desired location on the head portion 20 of the tool 10 (or elsewhere on the tool 10, for that matter) and may be expressed in any desired length or combination of lengths. Alternatively, if desired, the markings 25 may be entirely omitted from the tool 10. A viewing aperture 26 extends through the first leg 23 of the head portion of the illustrated tool 10. The purposes of the markings 25 and the viewing aperture 26 will be explained below.

The illustrated tool 10 also includes a second portion (hereafter referred to as the tail portion), indicated generally at 30, including a body 31 that extends linearly from a first end 32 to a second end 33. However, the body 31 of the tail portion 30 need not extend linearly between the first and second ends 32 and 33 thereof. The body 31 of the illustrated tail portion 30 has a generally rectangular cross-sectional shape, although such is not required. One or more openings 31*a* (see FIG. 5) extend through the body 31 of the tail portion 30 for a purpose that will be explained below. In the illustrated embodiment, four of these openings 31*a* extend through the body 31 of the tail portion 30. However, a greater or lesser number of such openings 31*a* may be provided as desired.

The illustrated tail portion 30 of the tool 10 has a plurality of markings 34 provided thereon. In the illustrated embodiment, these markings 34 are provided on the upper surface (when viewing FIGS. 1 through 9) of the body 31 of the tail portion 30 and are expressed in the manner of a conventional thirty-six inch ruler having one-eighth inch intervals. However, the markings 34 may be provided at any other desired location on the tail portion 30 of the tool 10 (or elsewhere on the tool 10, for that matter) and may be expressed in any desired length or combination of lengths. Alternatively, if desired, the markings 34 may be entirely omitted from the tool 10.

Figure 4:
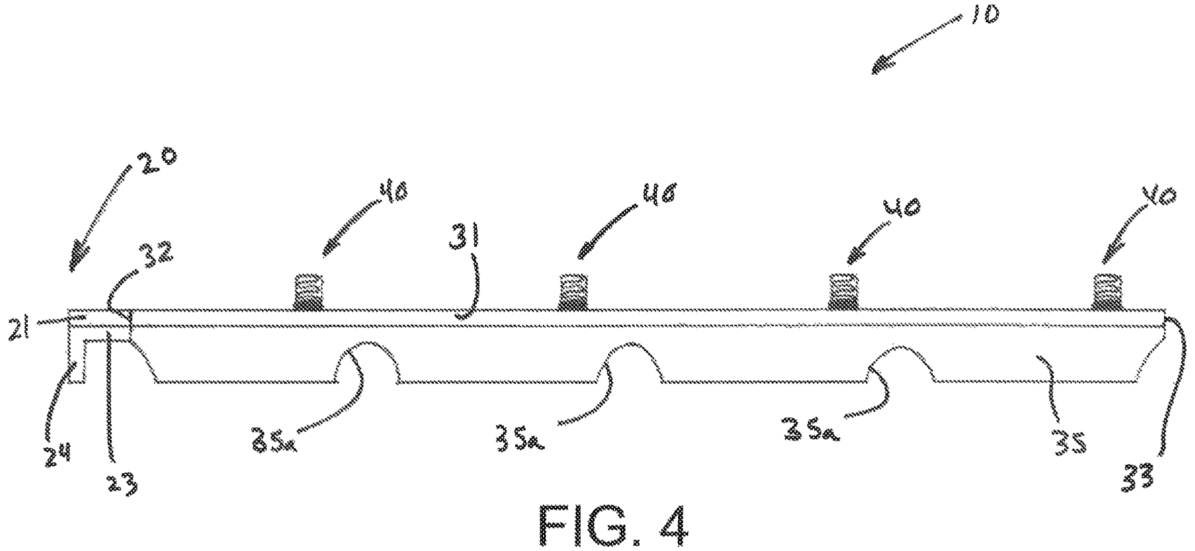
FIG. 4 is a side elevational view of the tool illustrated in FIGS. 1, 2, and 3.

As best shown in FIG. 4, the tail portion 30 of the tool 10 also includes a support 35. In the illustrated embodiment, the body 31 and the support 35 are formed as separate pieces of material (such as metal and rigid foam) that are secured together by any desired means. Alternatively, the body 31 and the support 35 may be formed as a single unitary piece. The support 35 has one or more recesses 35*a* provided in a surface thereof. In the illustrated embodiment, the support 35 has four of such recesses 35*a* provided in the surface. However, any desired number of such recesses 35*a* may be provided in the support 35, and such recesses 35*a* may extend in any desired direction in the surface. The purpose for these recesses 35*a* will be explained below. As used herein, the term "recess" is intended to cover any structure that is recessed into, or extends from, the head portion 20 of the tool 10 that is capable of performing the functions described below.

The illustrated tool 10 further includes a plurality of operation-performing devices, indicated generally at 40, that are supported on the body 31 of the tail portion 30 of the tool 10. In the illustrated embodiment, each of the operation-performing devices 40 extends through an associated one of the openings 31*a* extending through the body 31 of the tail portion 30. Thus, four of such operation-performing devices 40 are supported on the body 31 of the tail portion 30. However, it will be appreciated that a greater or lesser number of such operation-performing devices 40 may be supported on the body 31 of the tail portion 30. As will be explained in detail below, each of these operation-performing devices 40 is adapted to perform an operation on the illustrated corrugated panel 100.

Figure 5:
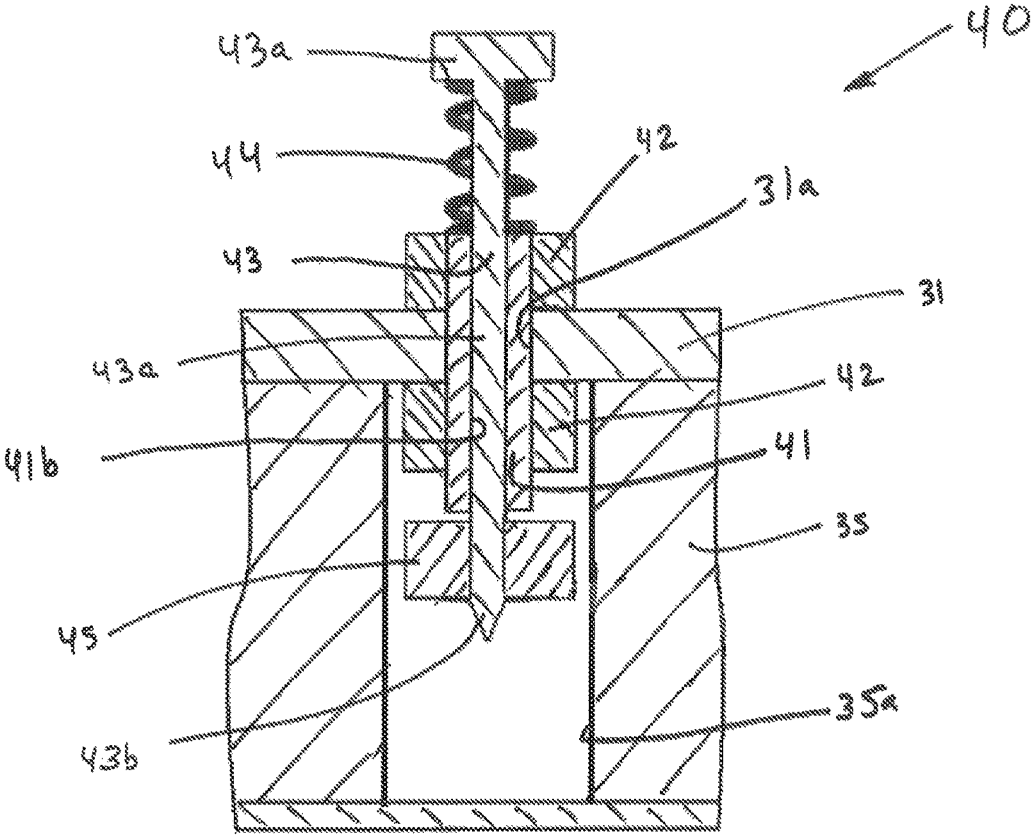
FIG. 5 is an enlarged side sectional view of portions of the tool and the workpiece shown in FIGS. 1 through 4, together with an operation-performing device.

FIG. 5 illustrates the structure of one of the operation-performing devices 40. As shown therein, the operation-performing device 40 includes a generally hollow and cylindrical housing 41 having a threaded outer surface 41*a* and an internal passageway 41*b*. The housing 41 of the operation-performing device 40 is disposed within the opening 31*a* extending through the body 31 of the tail portion 31, but the operation-performing device 40 is not retained in position axially relative to the body 31 of the tail portion 30. Rather, in a manner that is described in detail below, first and second fasteners 42 are engaged with the threaded outer surface 41*a* of the housing 41 to retain the operation-performing device 40 in a desired axially position relative to the body 31 tail portion 30 of the tool 10.

The operation-performing device 40 also includes a pin 43 that is supported on the housing 41 for movement relative thereto. As best shown in FIG. 5, the illustrated pin 43 is generally elongated and cylindrical in shape, extending from an enlarged head portion 43*a* (which may be located at or near a first axial end thereof) to a tip portion 43*b* (which may be located at or near a second axial end thereof). An intermediate portion 43*c* of the pin 43 (which is located between the head portion 43*a* at the tip portion 43*b*) extends through the internal passageway 41*b* of the housing 41 and, therefore, is journaled within the hollow housing 41 of the operation-performing device 40 for axial sliding movement relative thereto. However, the pin 43 may be supported in any desired manner on any desired portion of the housing 41 of the operation-performing device 40 and for movement in any direction relative thereto.

If desired, a mechanism may be provided to urge the pin 43 toward a predetermined position relative to the operation-performing device 40. In the illustrated embodiment, this urging mechanism is a spring 44 that reacts between the housing 41 of the operation-performing device 40 and the head portion 43*a* of the pin 43. The spring 44 urges the pin 43 toward a retracted position (upwardly when viewing FIGS. 5, 6, and 9) away from the tail portion 30 of the tool 10. The illustrated spring 44 is a conventional helically coiled spring, although any other resilient mechanism may be used. When such a resilient mechanism is provided, then it may be desirable to additionally provide a retainer 45 at or near the tip portion 43*b* of the pin 43. The retainer 45 may be embodied as any structure can be secured to the pin 43 to prevent the spring 44 from inadvertently ejecting the pin 43 outwardly from the housing 41 of the operation-performing device 40 during use.

The operation-performing device 40 can be assembled onto the tail portion 30 of the tool 10 by initially inserting the housing 41 of the operation-performing device 40 through the opening 31*a* of the body 31 of the tail portion 30. The housing 41 of the operation-performing device 40 is then moved through the opening 31*a* of the body 31 until the housing 41 is located in a desired location relative to the body 31 of the tail portion 30. Then, the first and second threaded fasteners 42 are threaded onto respective ends of the threaded outer surface 41*a* of the housing 41 that are located on opposite sides of the body 31 of the tail portion 30. Next, the threaded fasteners 42 are rotated (typically in opposite rotational directions) until they respectively abut opposing sides of the body 31 of the tail portion 30, as shown in FIG. 5. In this manner, the threaded fasteners 42 mechanically engage the opposing sides of the body 31 of the tail portion 30 to positively retain the housing 41 of the operation-performing device 40 in the desired axial position relative to the body 31 of the tail portion 30.

Next, the spring 44 is disposed about the intermediate portion 41*c* of the pin 43 adjacent to the head 43*a* thereof, and the tip portion 43*b* of the pin 43 is inserted through the passageway 41*b* extending through the housing 41 of the operation-performing device 40. As a result, the spring 44 is captured between the head portion 43*a* of the pin 43 and the upper one of the threaded fasteners 42, as also shown in FIG. 5. When it is axially compressed, the spring 44 urges the pin 43 toward the predetermined position relative to the housing 41 of the operation-performing device 40 (as well as the tail portion 30 of the tool 10). Lastly, the retainer 45 is secured to the pin 43 to prevent the spring 44 from inadvertently ejecting the pin 43 from the housing 41 of the operation-performing device 40 during use, as also described above.

Figure 6:
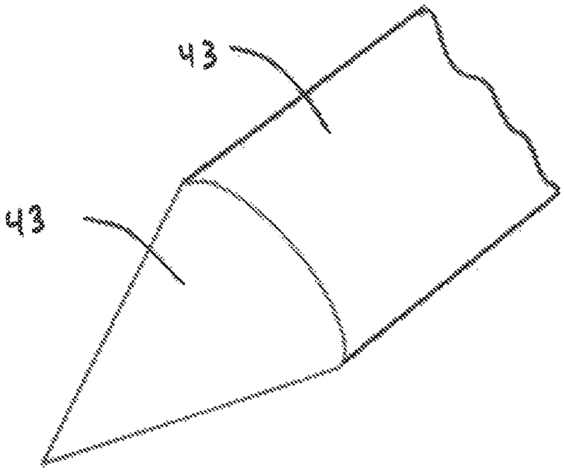
FIG. 6 is a further enlarged perspective view of a tip portion of the operation-performing device shown in FIG. 5.
Figure 7:
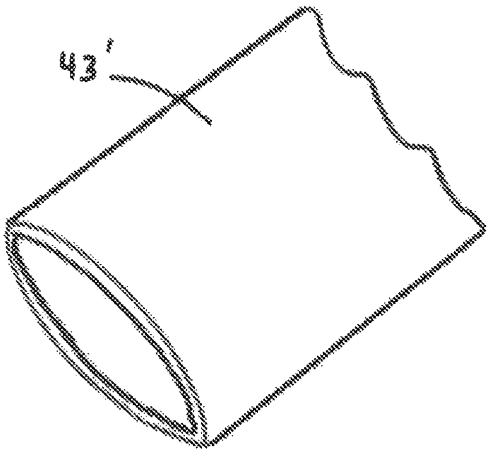
FIG. 7 is an enlarged perspective view of an alternative embodiment of the tip portion of the operation-performing device shown in FIG. 6.

FIG. 6 illustrates the structure of the tip portion 43*b* of the pin 43 in detail. As shown therein, the illustrated tip portion 43*b* of the pin 43 is generally conical in shape, tapering down from a relatively large outer diameter adjacent to the intermediate portion 43*c* to a point. However, the tip portion 43*b* of the pin 43 may have any other desired structure. FIG. 7 illustrates one such alternative structure, wherein the tip portion 43*b*' is generally hollow and cylindrical in shape. The advantage of provided by this alternative structure will be discussed below.

In order to install the tool 10 on the workpiece 100 for use, the tool 10 is moved from a non-engaged position relative to the workpiece (illustrated in FIG. 1) to an engaged position relative to the workpiece 100 (illustrated in FIG. 2). As a result, the second corrugated portions 102 of the workpiece 100 are respectively received within the recesses 35*a* provided in the support 35, as shown in FIGS. 8 through 11. Preferably, the recesses 35*a* are sized and shaped to be engaged snugly by the associated second corrugated portions 102 so as to prevent any significant movement between the tool 10 in the workpiece 100 (except, of course, in the longitudinal direction defined by the second corrugated portions 102). To further ensure and/or confirm proper positioning, the first leg 23 of the head portion 20 of the tool 10 may additionally engage a portion of the workpiece 100.

The viewing aperture 26 is provided in the head portion 20 of the tool 10 in order to facilitate the proper positioning of the tool 10 relative to the workpiece 100 in the longitudinal direction defined by the second corrugated portions 102. To accomplish this, a visual indication (not shown) may be initially provided at a suitable location on the workpiece 100. Then, after being assembled on the workpiece 100 as described above, the tool 10 is moved relative to the workpiece 100 in the longitudinal direction defined by the second corrugated portions 102 until the viewing aperture 26 through the head portion 20 of the tool is aligned with the visual indication provided on the workpiece 100. When that occurs, the tool 10 is proper positioned relative to the workpiece 100 in the longitudinal direction defined by the second corrugated portions 102.

FIGS. 8 through 11 illustrate how, after the tool 10 has been positioned relative to the workpiece 100 as described above, the operation-performing device 40 can be operated to perform an operation on the workpiece 100. For the purposes of this discussion, the operation-performing device 40 will be described in the context of a device for creating one or more precisely located visible targets in the surface of one of the first corrugated portions 101 of the workpiece 100. These visible targets can be used, for example, to precisely locate where a subsequent drilling operation should be performed to create respective apertures through the workpiece 100. However, it will be appreciated that the operation-performing device 40 can be operated to perform any other desired operation on the workpiece 100.

To accomplish this efficiently, it is desirable that the openings 31*a* extending through the body 31 of the tail portion 30 of the tool 10 (and, therefore, the locations of the operation-performing devices 40 supported therein) be precisely located where the desired visible targets are intended to be created in the workpiece 100. The tool 10 of this invention may have any desired number of such openings 31*a* (and associated operation-performing devices 40) provided thereon at any desired locations in accordance with local building codes and/or other regulations at the construction site.

Figure 8:
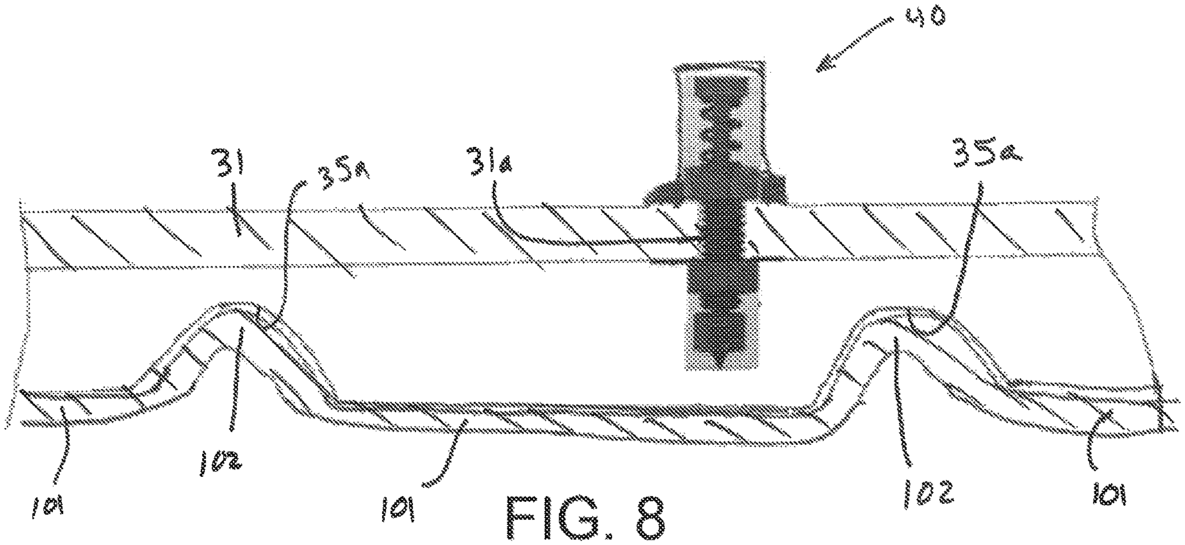
FIG. 8 is an enlarged side sectional view of the operation-performing device illustrated in FIG. 5 shown in a first stage of actuation.
Figure 9:
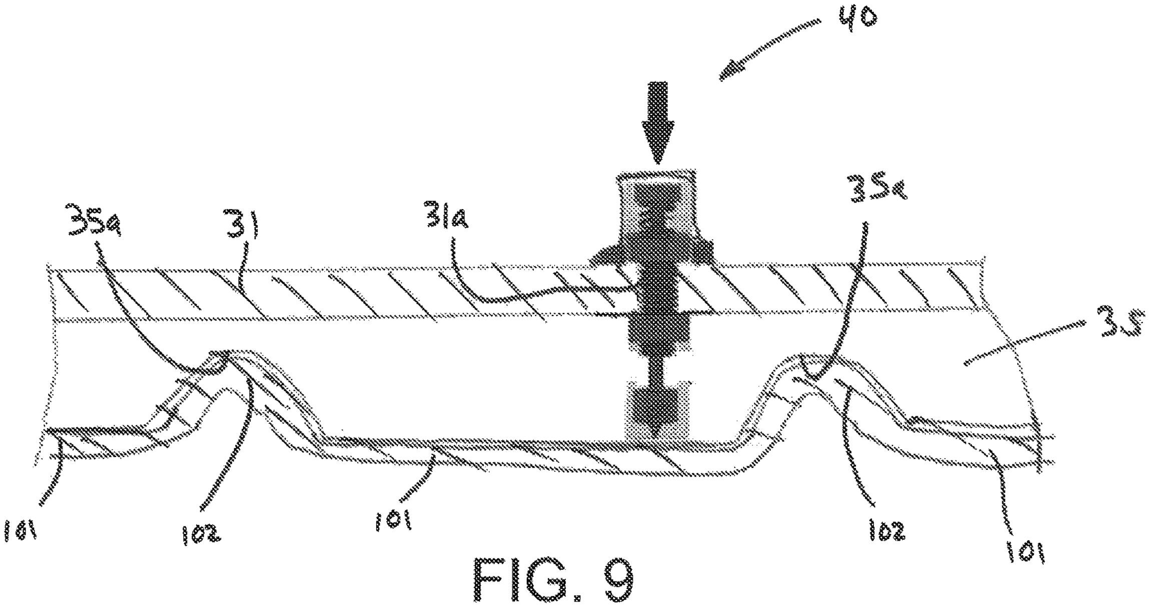
FIG. 9 is an enlarged side sectional view similar to FIG. 8 showing the operation-performing device in a second stage of actuation.

In any event, FIG. 8 shows the operation-performing device 40 in a first stage of actuation, wherein the tool 10 is supported on and positively positioned relative to the workpiece 100. In this first stage of actuation, the pin 43 is located in the retracted position within the operation-performing device 40 under the urging of the spring 44.

Next, an external force is applied to the head portion 43*a* of the pin 43 that is both opposite in direction to and greater in magnitude than the direction and amount of the force described above that is exerted by the spring 44 on the head portion 43*a* of the pin 43. This force may be applied by any desired device or in any desired manner including, for example, by a hammer, a hand of an operator, and the like. Regardless of how it is applied, however, this external force causes the pin 43 to move axially through the housing 41 of the operation-performing device 40 (downwardly when viewing FIGS. 5, 6, and 9) away from the retracted position. As a result, the tip portion 43*b* of the pin 43 is moved toward the first corrugated portion 101 of the workpiece 100 against the urging of the spring 44 into a second stage of actuation illustrated in FIG. 9.

Figure 10:
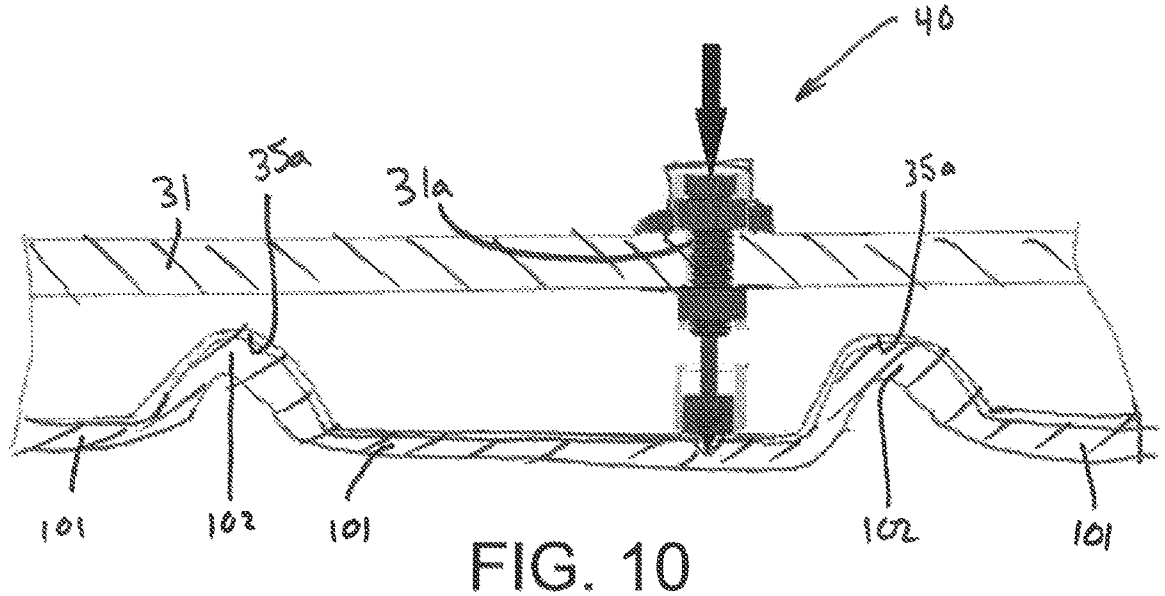
FIG. 10 is an enlarged side sectional view similar to FIG. 9 showing the operation-performing device in a third stage of actuation.
Figure 11:
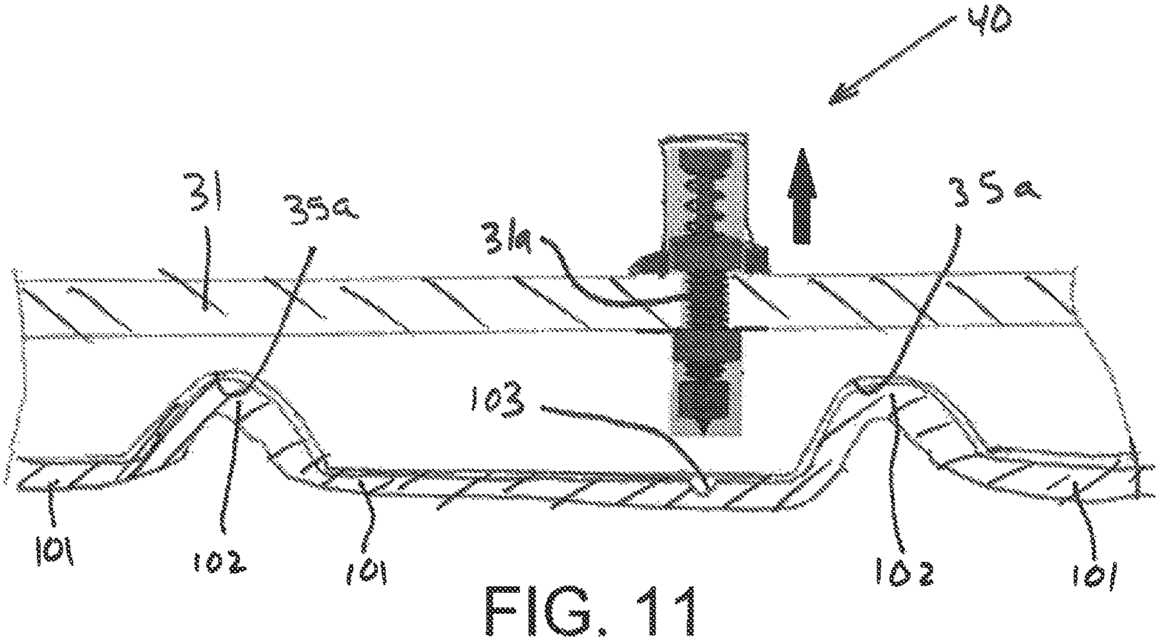
FIG. 11 is an enlarged side sectional view similar to FIG. 10 showing the operation-performing device after being returned to the first stage of actuation.

The pin 43 continues to move in this manner until the tip portion 43*b* engages the surface of the first corrugated portion 101 of the workpiece 100, as shown in FIG. 10. In this third stage of actuation, the tip portion 43*b* of the pin 43 creates a visible target 103 (in the form of a physical depression) in the service of the first corrugated portion 101 of the workpiece 100. Thereafter, the external force is removed from the head portion 43*a* of the pin 43, which allows the spring 44 to again retract the pin 43 within the housing 41 of the operation-performing device 40, as shown in FIG. 11.

The other operation-performing devices 40 that are supported on the body 31 of the tail portion 30 of the tool 10 can be operated in the same manner to create other visible targets (not shown) in the surface of the first corrugated portion 101 of the workpiece 100 or elsewhere if desired. When finished, the tool 10 can be removed from the workpiece 100 and re-positioned elsewhere for continued use.

As mentioned above, the tip portion 43*b* of the pin 43 may be embodied having either the generally conical shape shown in FIG. 6, the generally hollow and cylindrical shape shown in FIG. 7, or any other desired shape or structure. The use of the generally conical shape shown in FIG. 6 may be preferred for use when the surface of the workpiece 100 is oriented perpendicularly (or at least close to perpendicularly) relative to the pin 43 when the tip 43*b* engages the workpiece 100. Alternatively, the use of the generally conical shape hollow and cylindrical shape shown in FIG. 7 may be preferred for use when the surface of the workpiece 100 is not oriented close to perpendicularly relative to the pin 43 when the tip 43*b* engages the workpiece 100.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A tool that is adapted to be retained in a predetermined position relative to a workpiece having a corrugated portion that defines a size and shape and to perform an operation on the workpiece, the tool comprising:

a head portion including a leg that is adapted to engage a workpiece when the tool is in a predetermined position relative to the workpiece;

a tail portion extending from the head portion and including a support having a recess that defines a size and shape that is adapted to engage the corrugated portion of the workpiece without penetrating therein so as to retain the tool in the predetermined position relative to the workpiece; and an operation performing device supported on the tail portion and operable to perform an operation on the workpiece when the tool is in a predetermined position relative to the workpiece.

2. The tool defined in claim 1 wherein the head portion of the tool has a generally L-shaped cross-sectional shape defined by a first leg and a second leg that extend generally perpendicular to one another, and wherein the leg is the first leg of the head portion of the tool.

3. The tool defined in claim 2 wherein the head portion of the tool has a plurality of markings provided thereon.

4. The tool defined in claim 3 wherein the head portion of the tool has a viewing aperture extending therethrough.

5. The tool defined in claim 1 wherein the tail portion of the tool includes a body that extends from the head portion of the tool and has an opening extending therethrough, wherein the operation performing device extends through the opening so as to be supported on the tail portion of the tool.

6. The tool defined in claim 5 further including a support that is supported on the body of the tail portion of the tool, and wherein the recess is provided in the support.

7. The tool defined in claim 1 wherein the support has a plurality of recesses that define sizes and shapes that are adapted to engage a corresponding plurality of corrugated portions of the workpiece without penetrating therein so as to retain the tool in the predetermined position relative to the workpiece.

8. A tool that is adapted to be retained in a predetermined position relative to a workpiece having a corrugated portion that defines a size and shape, the tool comprising:

a head portion including a leg that is adapted to engage a workpiece when the tool is in a predetermined position relative to the workpiece;

a tail portion extending from the head portion and including a support having a recess that defines a size and shape that is adapted to engage the corrugated portion of the workpiece without penetrating therein so as to retain the tool in the predetermined position relative to the workpiece.

* * * * *